A. C. STEWART.
PHOTOGRAPHIC INDICATING DEVICE.
APPLICATION FILED APR. 8, 1915.
1,211,780.
Patented Jan. 9, 1917.
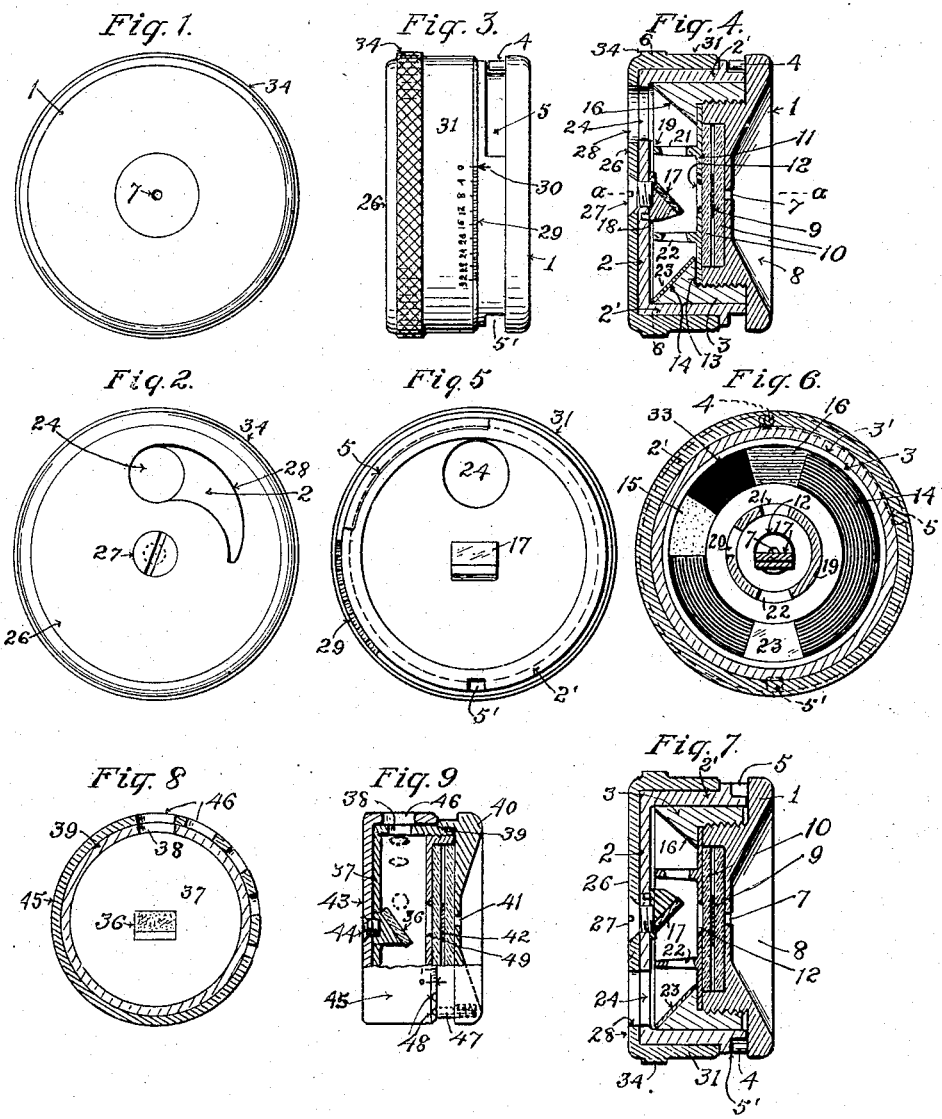
Inventor:
Alfred C. Stewart
by Arthur P. Knight
his Atty

UNITED STATES PATENT OFFICE.

ALFRED C. STEWART, OF LOS ANGELES, CALIFORNIA.

PHOTOGRAPHIC INDICATING DEVICE.

1,211,780.  Specification of Letters Patent.  Patented Jan. 9, 1917.

Application filed April 8, 1915. Serial No. 20,067.

*To all whom it may concern:*

Be it known that I, ALFRED C. STEWART, a citizen of the United States, residing at Los Angeles, in the county of Los Angeles and State of California, have invented a new and useful Photographic Indicating Device, of which the following is a specification.

This invention relates primarily to an actinometer, for measuring the intensity of light proceeding from a certain source, for instance, an object which is to be photographed, particularly with reference to the actinic intensity of such light; and the main object of the invention is to provide a device for this purpose which will measure or indicate the light intensity with a satisfactory degree of accuracy, under the usual conditions of practice.

Another object of the invention is to provide a device for the above stated purpose which will be convenient in manipulation and operation.

A further object of the invention is to provide an actinometer which may also be used as a field indicator for the photographic instrument with which it is to be used.

Another object of the invention is to provide for indication of the photographic contrast values of any scene or object, so as to avoid exposure of films on subjects which are lacking in pictorial value.

The accompanying drawings illustrate embodiments of my invention and referring thereto:

Figure 1 is a front elevation, Fig. 2 a rear elevation, and Fig. 3 a side elevation, of the device. Fig. 4 is a vertical section thereof. Fig. 5 is a front elevation of the objective member of the device. Fig. 6 is a section on line 6—6 in Fig. 4. Fig. 7 is a section similar to Fig. 4, showing the objective member turned to position for field observation. Fig. 8 is a transverse section of a modification, and Fig. 9 is a longitudinal section thereof, partly in elevation.

Referring to Figs. 1 to 7, the device comprises an eye-piece or front member 1 and an objective or rear member 2, mounted to rotate on the member 1, around an axis (indicated at a—a) corresponding to the axis of vision through the eye-piece. For this purpose a cylindrical bearing face 3' may be formed on a collar 3 screwing on member 1, and the member 2 may be provided with a cylindrical sleeve or flange 2' rotatably fitting on said cylindrical bearing face. One of the members aforesaid, for example, the eye-piece 1 is provided with a pin or projection 4, working within a slot or recess 5 in the other member, so as to limit the amount of rotation. Another recess 5' may be provided in member 2, for engaging pin 4 in another position of the device.

Eye-piece or front member 1 is provided with a central aperture 7, forming an artificial pupil, which limits the amount of light entering the eye of the observer, so that regardless of the condition of enlargement or contraction of the pupil of the observer's eye, the amount of light received by his eye is determined by the size of this aperture 7. For this purpose the aperture 7 is made as small as or smaller than the minimum, or most contracted, size of the pupil of the normal human eye. Member 1 is formed with a depression or recess 8 in its front face, the aperture 7 being at the bottom or back of this recess so as to be properly spaced from the eye. Directly back of this aperture is mounted a color screen, consisting, for example, of a sheet 9 of colored gelatin, held between glass plates 10. A stop plate 11 is provided back of the screen and has an aperture 12. The stop plate and screen may be held in position by a shoulder 13 on the collar 3 engaging the stop plate and clamping the screen plates 10 between the plate 11 and member 1. Collar 3 has an inclined inner face 14 for supporting light receiving diffusing and reflecting surfaces or means 15 and 16, consisting, for example, of sheets of paper, one of which may be white, and the other is suitably colored, for example, blue. Inclined face 14 is further provided with a black or light absorbing surface 33, between the surfaces 15 and 16.

Member 2 carries a mirror 17 placed directly at the rear of the aperture 12 and mounted on a support 18 so as to extend at an angle of 45 degrees to the axis a—a of the instrument, so that light passing from either of the light receiving and diffusing surfaces 15 and 16 will be reflected through the apertures 12 and 7. A stop ring 19 is preferably provided around this mirror and is provided with apertures 20 and 21, located respectively in radial line with diffusing surfaces 15 and 16; and said ring 19 is also provided with an aperture 22 in radial line with a mirror 23 on the inclined face 14. Ring 19 is carried by the member 1, being, for example, formed on the stop plate 11.

Member 2 is provided with an aperture 24 located directly back of the inclined ring face 14, so as to allow light from an object at the rear of the device to pass to said inclined face and to be reflected diffusively from either of the diffusive surfaces 15 and 16, or to be absorbed by the black portion 33 of such inclined face between surfaces 15 and 16. A variable stop-plate or disk 26 is mounted to turn on pivot 27 on member 2, and is provided with a stop aperture, 28, which is preferably tapered, so as to shut off more or less of the light from aperture 28, according to the angular position of the plate or disk 26. Member 26 is provided with a cylindrical flange 31, surrounding the cylindrical flange 2′ on member 2, and provided with a knurled ring 34 whereby it may be turned. A scale 29 on flange 31 of member 26 reads on a pointer or index 30 on flange 2′ of member 2, so as to indicate the relative rotation of members 26 and 2 from normal position. The pivotal mounting of member 26 on member 2 presents sufficient friction to cause member 2 to turn with members 31 and 26 until the motion of member 2 is arrested by stop means 4, 5, whereupon further movement of member 26 will cause it to turn on member 2.

The operation of this form of my invention is as follows: In using it as an actinometer, the device is held close in front of one eye of the observer, and in such position that the axis $a$—$a$ thereof is directed toward the object or scene which is to be photographed. The light from such object passes through aperture 24 and falls on the inclined inner face 14 of collar 3. Assuming now that the member 2 is turned on member 1 so as to bring aperture 24 in register with the diffusing surface 16 of darker shade, said surface is illuminated by the light passing through said aperture and some of the diffused light rays pass through the aperture in collar 19 and are reflected from mirror 17 so as to pass through aperture 12, color screen 9 and aperture 7 to the observer's eye. The color screen 9 eliminates all but the actinic rays so that the operator is enabled to properly judge the actinic power of the light. The scale member 31 is then turned on member 2, the latter being held from rotation by means 4, 5, and the width of the variable stop aperture 28 is thereby reduced until the light disappears at 7. The observer then turns the member 31, and with it, the member 2, back in the opposite direction, causing the light receiving aperture 24 to first pass over the black surface 33 and to then register with the brighter diffusing surface 15. If light does not then appear at 7, the motion of member 31, in the same direction, is continued until it turns sufficiently on member 2 to widen the variable stop aperture 28 so as to illuminate the surface 15 to an extent sufficient to produce appreciable light at 7. By alternate rotations of member 31, back and forth, in this manner, the variable stop may be brought to a position such that light is seen when the aperture 24 is opposite the brighter surface 15, but not when it is opposite the darker surface 16. The position of the scale is then read with reference to the index 30, and the observer is thereby advised as to the proper stop or shutter adjustment to use in photographing the object.

Certain features and advantages of the operation above described may be pointed out as follows: The inspection of the light at the eye-piece is effected when the light is being diffused from one of the surfaces 15 and 16, immediately after the aperture 24 has passed over the black surface 33, so that the existence of appreciable light is tested in comparison with a condition of darkness, this being a more definite standard of comparison than is otherwise possible without the use of extraneous sources of light. The light being diffused from the surface 15 or 16 gives the general effect of the illumination of the object as a whole, and by the action of the color screen, this effect is limited to that of the actinic rays. The illuminating effect is tested by comparing successively the action of diffusing surfaces of different shades, so that any desired accuracy may be secured by approximating the shading of such surfaces. The eye-piece aperture being as small, or smaller, than the minimum size of a normal human eye, the visual effect at 7 is independent of any contraction or enlargement of the pupil. This is of great importance in giving uniform readings, since the tendency of the eye, when receiving a slight illumination, is to gradually enlarge the pupil, so that the amount of light entering the eye will vary with the length of time of exposure, but by providing this constant small aperture any attempt of the eye to thus receive more light will be frustrated, and the reading will depend only on the amount of light actually entering the light receiving aperture 24.

In case it is desired to use the device as a field indicator, the objective member 2 is drawn slightly away from the eye piece, to disengage recess 5 from pin 4, and is then turned about half way around and drawn back toward the eye-piece to engage recess 5′ with pin 4. The light receiving aperture 24 and mirror 17 are then (as shown in Fig. 7) to cause the light passing through said aperture and reflected from mirror 7 to be again reflected by mirror 23 and to reach the eye-piece aperture as undiffused light, so that the observer will see at such aperture the field or portion of the scene or object limited by the size of the stop opening 12, and corresponding to the field which would be taken by a lens having a working angle corresponding to said stop aperture. Moreover, under these conditions, the color screen 9 enables the observer to judge the actinic value of the picture, particularly with regard to the contrast values therein.

In the form of the invention shown in Figs. 8 and 9, the mirror is dispensed with and a single diffusive reflector 36 is provided on objective member 37, for receiving light from an aperture 38 in a cylindrical flange 39 on said member. Member 37 is shown as rigidly mounted or formed on the eye-piece 40, having aperture 41 adapted to receive the light from diffusive reflector 36, a color screen 42 and fixed stop 49 being provided for said aperture. A variable stop member 43 is mounted to turn on member 37, by pivot 44, and has a flange 45 provided with a series of apertures 46 of different size, adapted to register selectively with the aperture 38 in flange 39, and a snap device 47 may be provided for engaging a series of recesses 48 in member 43, to hold the parts in proper register. In using this form of the invention, the device is held with the aperture 38 toward the object to be viewed, and the variable stop member 43 is turned until the light just disappears at the eye-piece. In this case the light may be judged by alternate observations taken through two adjacent openings 46, the ring or member 43 being turned back and forward to expose said openings alternately, and in turning from one opening to the other, the wall of the member 43 will more or less completely cover the aperture 38, producing a condition of less illumination than is produced by either of said openings, with the result that the eye is rested during the shifting operation, and a truer reading is secured.

In each of the forms of the invention above described there are provided means for shutting off the light more or less completely, in the movement of the adjustable indicating means from one adjusted position to another adjusted position, whereby the disturbing effects due to eye-fatigue may be avoided.

What I claim is:

1. A photographic indicating device comprising an objective aperture member, a diffusing device including a plurality of sections of different light absorptive capacity, means for bringing the various sections at will into the path of the light transmitted through the objective aperture, an eyepiece containing an aperture for viewing said light absorbing sections, and adjustable controlling means for controlling the amount of light transmitted through the objective aperture.

2. A photographic indicating device comprising an objective aperture member, adjustable controlling means for controlling the amount of light transmitted through the objective aperture, means comprising two light diffusing surfaces and an intermediate light absorbing surface, adapted to be brought successively and by the same movement into the path of the light transmitted through the objective aperture without affecting the adjustment of said adjustable controlling means, and an eyepiece containing an aperture for viewing said diffusing and absorbing surfaces.

3. A photographic indicating device comprising an objective aperture member, adjustable controlling means for controlling the amount of light transmitted through the objective aperture, means comprising a plurality of surfaces of different light diffusing capacity adapted to be brought successively and by the same movement into the path of the light from the objective aperture without affecting the adjustment of said adjustable controlling means, and an eyepiece containing an aperture for viewing said diffusing surfaces.

4. In a photographic indicating device, an eye-piece provided with an aperture, means for receiving light from an object and transmitting it to said aperture, said means comprising diffusive reflecting surfaces of different shade, means for bringing the surfaces selectively into action, and means for variably stopping the light received from the object.

5. In a photographic indicating device, an eye-piece provided with an aperture, means movably mounted with relation to the eye-piece, for receiving light from an object and transmitting it to the eye-piece, in one position of such means and provided with means for absorbing such light in another position of such means, to enable a condition of illumination at the eye-piece to be compared with a condition of no illumination, and indicating means provided with means for variably stopping the light received from the object.

6. A photographic indicating device comprising an eye-piece provided with an aperture, with a color screen and with a fixed apertured stop, and means movably mounted on the eye-piece, and adapted in one position to transmit light from an object directly to the eye-piece, and in other positions to diffusively transmit light from said object to the eye-piece, and to variably control and indicate the light so diffusively transmitted.

7. In a photographic indicating device, an eye-piece provided with an aperture, with a color screen and with a fixed-apertured stop, an objective member mounted to rotate on said eye-piece and provided with a light receiving aperture and with a mirror, and means mounted on the eye piece and provided with a light diffusing surface, with a light absorbing surface, and with a mirror surface, adapted to be brought selectively into coöperative relation with the aperture and mirror on the objective member, by rotation of said member, and variable stop means for controlling the amount of light passing through said light receiving aperture.

In testimony whereof I have hereunto set my hand, at Los Angeles, California, this 26th day of March, 1915.

ALFRED C. STEWART.

Copies of this patent may be obtained for five cents each, by addressing the "Commissioner of Patents, Washington, D. C."